2,990,419
ORGANOPOLYSILOXANE OILS

Siegfried Nitzsche, Erich Schmidt, and Manfred Wick, all of Burghausen, Oberbayern, Germany, assignors to Wacker-Chemie G.m.b.H., Munich, Bavaria, Germany
No Drawing. Filed Apr. 8, 1959, Ser. No. 804,860
Claims priority, application Germany Apr. 10, 1958
7 Claims. (Cl. 260—448.2)

The present invention relates to a method of preparing stable, high viscosity organopolysiloxane oils.

Organopolysiloxane oils are known polymeric materials employed as defoaming agents, lubricants, mold release agents, damping fluids, hydraulic fluids and in a host of other uses. The organopolysiloxane oils are popularly known as silicone fluids.

The silicone fluids are usually prepared by hydrolyzing organosilanes containing two organic substituents and two hydrolyzable substituents per molecule. Such silanes are often represented by the formula $R_2SiX_2$ where each R is a monovalent organic substituent and each X is an easily hydrolyzable atom or radical such as halogen atoms and alkoxy radicals. The hydrolysis is accompanied by condensation of the hydroxyl groups, and further condensation can be brought about with condensation catalysts and heat. However, the end product of the condensation reaction will be a hydroxyl endblocked linear siloxane polymer of the general formula $$HO[R_2SiO]_nH$$

The value of $n$ may be very large in the case of a high degree of condensation or it may be quite small when only a limited degree of condensation occurs.

The organopolysiloxane oils prepared as above have terminal hydroxyl groups which are potentially reactive. The gradual condensation of the terminal end groups in the presence of trace amounts of condensation catalyst remaining in the polymer will cause further polymerization and gelation of the fluid. This gelation is accelerated at elevated temperatures.

In addition to the gelation phenomenon discussed above, the diorganosiloxane polymers prepared as indicated will contain significant amounts of the alkaline material or acid employed as condensation catalyst. These catalysts must be washed out of the polymer because they will bring about the depolymerization of the polymer. The high polymer degrades to low molecular weight cyclic materials which are relatively stable to the further action by the catalysts. Thus, unless the catalysts are washed out or otherwise neutralized, the polymer is subject to degradation and this too will occur more rapidly at elevated temperatures.

The use of silicones is often based on their stability at elevated temperatures. This fact dictates the requirement that silicone fluids neither gel nor depolymerize at elevated temperatures. Several methods of building the required stability into silicone fluids have been proposed.

In general, the stabilization of the silicone fluids has been accomplished by removing the potentially reactive hydroxyl terminal groups and by washing out or neutralizing the condensation catalysts. The hydroxyl terminal groups are usually replaced with triorganosilyl groups. This is done by cohydrolyzing small amounts of silanes of the formula $R_3SiX$ where R is an organic substituent and X is a hydrolyzable substituent, with the silanes of the formula $R_2SiX_2$ as defined above. This cohydrolysis and condensation produces siloxanes of the formula  $R_3SiO[R_2SiO]_nSiR_3$ but the condensation catalysts must be removed from the polymer.

A second means of producing the desired triorganosilyl endblocked diorganosiloxane polymers consists of the equilibration of the hydroxyl endblocked diorganosiloxanes or cyclic diorganosiloxanes with low molecular weight siloxanes containing $R_3SiO_{1/2}$ units such as

$R_3SiOSiR_3$

Such equilibrations are catalyzed by acids or preferably by alkaline materials including alkaline metal salts of silanes and siloxanes such as sodium silanolate or potassium siloxanolate. The catalyst must be neutralized or removed in this method too.

The high polymer with triorganosilyl endblocking also contains catalyst which required neutralization or removal. Neutralization merely results in larger amounts of foreign materials including salts, esters and so forth in the polymer hence the usual method of removing the condensation or rearrangement catalysts involves washing the polymer.

Repeated washing of high molecular weight polymer is tedious and expensive. The water and polymer will form an emulsion which must be separated before further washing can be accomplished. Furthermore, any solvent and low polymeric units present must be distilled off and filtration of the polymer is required to obtain a clear polymeric oil. It is apparent that washing, filtration, and even distillation of high molecular weight polymers (e.g. polymers having viscosity exceeding 100,000 cs. at 25° C.) is difficult, time consuming and expensive.

Another difficulty encountered with the addition of triorganosilyl units to endblock diorganosiloxane polymeric chains lies in the small proportion of triorganosilyl units required in high polymers. For example, a dimethylsiloxane polymer having a viscosity of about 100,000 cs. at 25° C. will have about 1 triorganosilyl group per 500 dimethylsiloxane units. Merely dropping the triorganosilyl units-dimethylsiloxane units ratio to 1/400 reduces the viscosity of the polymer to about 65,000 cs. at 25° C. This gives some indication of the delicate balance between triorganosilyl endblocking units and diorganosiloxane units which must be controlled to obtain a siloxane fluid of the desired polymer. Small variations in the amount of triorganosilyl units present will result in a wide deviation in the viscosity of the fluid produced.

When the method outlined above is followed under rigorous control, most of the hydroxyl endblocking units may be replaced with inert triorganosilyl units. However, in high molecular weight polymers, the chains are long, immobile and unwieldy and the replacement of all of the hydroxyl groups present is difficult, if not impossible. Such high molecular weight materials will retain a significant percentage of hydroxyl endblockers and upon standing these hydroxyl groups will condense and form longer chain materials; thus gelation occurs.

Finally, the use of acid catalysts is not possible with arylpolysiloxanes because the acid causes the aryl groups to be cleaved from the silicon thus creating the crosslinking sites and destroying the fluid character of the polymer. Thus the polymerization must be carried forward with the alkaline catalysts which require washing and are not as effective as catalysts.

The object of this invention is to produce a stable organosiloxane fluid. Another object is to avoid the difficulties and expense of the methods heretofore employed in the production of triorganosilyl endblocked diorganosiloxanes. Further objects and advantages of this invention are noted in or will be apparent from the specification and claims of this application.

This invention relates to a method of preparing stabilized, high viscosity organopolysiloxane fluids comprising (A) mixing (1) hydroxyl endblocked diorganopolysiloxanes prepared by hydrolyzing silanes of the average formula $R_nSiX_{4-n}$ wherein each R is a monovalent hydrocarbon radical, halogenated monovalent hydrocarbon radical or trimethylsilmethylene radical

[(CH$_3$)$_3$SiCH$_2$—]

each X is a hydrolyzable substituent selected from halogen atoms and alkoxy radicals and $n$ has an average value of 2.00 to 2.01, preferably about 2.0, and (2) a small proportion of triorganosilyl endblocked diorganopoly siloxane having a viscosity of 1 to 10,000 cs. at 25° C., and (3) .0001 to 1.0% by weight of a phosphorous-nitrogen compound, (B) passing air through the mixture at room temperature until the viscosity becomes stabilized and (C) passing air through the mixture at a temperature of 100° C. to 200° C. until the viscosity of the fluid is stabilized.

The siloxanes (1) and (2) are substituted with organic radicals attached to silicon by C—Si bonds. These radicals can be alkyl radicals such as methyl, ethyl, propyl and octadecyl, aryl radicals such as phenyl, diphenyl and anthracyl, aralkyl radicals such as ethylphenyl, methylnaphthyl and tolyl, aralkyl radicals such as benzyl and phenylethyl, cycloaliphatic radicals such as cyclopropyl and cyclobutyl, and halogenated derivatives of the foregoing radicals, such as chlorophenyl, fluorophenyl, bromophenyl, chloromethyl, and bromobenzyl. All of the R groups on any silicon can be the same or each one can be different. Thus the diorganosiloxane units can be such units as dimethylsiloxane, ethylmethylsiloxane, dibutylsiloxane, methyloctadecylsiloxane, methylphenylsiloxane, methylchlorophenylsiloxane, diphenylsiloxane, tolylmethylsiloxane and benzylmethylsiloxane. The triorganosiloxane units can be such units as trimethylsiloxane, dimethylphenylsiloxane, ethylphenyltolylsiloxane, octadecylcyclopropylbenzylsiloxane and ethyldiphenylsiloxane.

The triorganosilyl endblocked diorganosiloxanes employed herein are low molecular weight materials of the general formula R$_3$SiO(R$_2$SiO)$_a$SiR$_3$ having a viscosity of from 1 to 10,000 cs. at 25° C. and preferably from 25 to 200 cs. at 25° C. These materials are known and can be made by the known processes. Small proportions of this siloxane are sufficient to stabilize large volumes of silicone fluids according to the method of this invention.

The phosphorous-nitrogen compounds employed as catalysts in this invention are phospho-nitrile halides or certain organo-nitrogen derivatives of phosphorous acid or phosphoric acid. The phospho-nitrile halides employed are preferably the polymeric chlorides represented by the formula (PNCl$_2$)$_b$ where $b$ is an integer greater than 2. The preferred polymers are those where $b$ is 3, 4, 5 or 6 and the commercial grade of such chlorides is usually a mixture of such polymers.

The organo nitrogen derivatives of phosphorous acid or phosphoric acid operative herein are represented by the general formulae

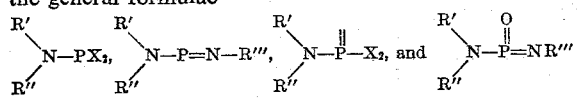

In these formulae R' and R'' are organic substituents selected from alkyl, aryl, alkaryl and aralkyl radicals and hydrogen, at least one of the substituents R' and R'' being an organic radical, R''' is an organic radical selected from the group alkyl, aryl, aralkyl and alkaryl radicals and X is a halogen atom preferably chlorine or bromine. Compounds representative of the preferred phosphorous-organo-nitrogen compounds operable herein include:

Phosphorous acid-dichloride-anilide
C$_6$H$_5$—NH—PCl$_2$
Phosphorous acid-dichloride-methyl-anilide
C$_6$H$_5$—N(CH$_3$)—PCl$_2$
Phosphorous acid-dichloride-ethyl-anilide
C$_6$H$_5$—(C$_2$H$_5$)—PCl$_2$
Phosphorous acid-dichloride-diphenylamide
(C$_6$H$_5$)$_2$N—PCl$_2$
Phosphorous acid-dichloride-methylamide
CH$_3$—NH—PCl$_2$
Phosphorous acid-dichloride-isopropylamide
(CH$_3$)$_2$CH—NH—PCl$_2$
Phosphorous acid-dichloride-benzylamide
C$_6$H$_5$—CH$_2$—NH—PCl$_2$
Phosphorous acid-anilide-anile
[C$_6$H$_5$N=P—NH—C$_6$H$_5$]$_2$
Phosphorous acid-methylamide-anile
C$_6$H$_5$—N=P—NH—CH$_3$
Phosphoric acid-dichloride-anilide
C$_6$H$_5$—NH—POCl$_2$
Phosphoric acid-dichloride-α-naphthylamide
C$_{10}$H$_7$NH—POCl$_2$
Phosphoric acid-dichloride-methylamide
CH$_3$NH—POCl$_2$
Phosphoric acid-dichloride-isopropylamide
(CH$_3$)$_2$CHNH—POCl$_2$
Phosphoric acid-dichloride-ethylamide
C$_2$H$_5$NH—POCl$_2$
Phosphoric acid-anilide-anile $$\underset{\underset{O}{\overset{\|}{}}}{C_6H_5NH—P=NC_6H_5}$$

Phosphoric acid-α-naphthylamide-anile $$\underset{\underset{O}{\overset{\|}{}}}{C_{10}H_7NH—P=NC_6H_5}$$

Phosphoric acid-methylamide-anile $$\underset{\underset{O}{\overset{\|}{}}}{CH_3NH—P=NC_6H_5}$$

Phosphoric acid-isopropylamide-anile $$\underset{\underset{O}{\overset{\|}{}}}{(CH_3)_2CHNH—P=NC_6H_5}$$

The method of this invention comprises admixing (1) the linear hydroxyl endblocked organopolysiloxane prepared by hydrolyzing R$_2$SiX$_2$ as defined above and (2) the low molecular weight triorganosilyl endblocked diorganosiloxane. The ratio of siloxane (2) to siloxane (1) to be employed in the mixture can readily be determined by calculation of the number of units desired in the average molecule of the ultimate polymer. The phosphorous-nitrogen compound is added to the siloxanes in any desired manner. Thus the siloxanes can be mixed and the catalyst added to the mixture or the catalyst can be mixed with either siloxane (1) or (2) and the other siloxane added to this mixture.

After the ingredients are mixed, the fluid mixture is brought into intimate contact with a stream of air. The air may be blown or bubbled through the reaction mass at room temperature until the mass is stabilized in viscosity. In a mixture wherein all of the organic substituents on the siloxanes are methyl radicals, the viscosity will be stabilized by vigorous air blowing within 24 hours. During this initial air blowing step the mixture becomes turbid and gradually becomes clear as the hydroxyl units present condense to form water and new molecules of siloxane and the water escapes with the current of air passing through the mixture. Further evidence of this condensation is found in the increase in viscosity noted in the mixture.

After the fluid has had air passed through it at room temperature until its viscosity is stabilized, the fluid will be sufficiently stable for use at elevated temperatures for relatively short periods of time and such fluids may be sufficiently stable for many uses. However, when the fluid is to be exposed to elevated temperatures for many hours or days, it is desirable to further treat the fluid by contacting the fluid with a stream of air such as by blowing air through the fluid at 100° to 200° C., preferably 135° to 175° C., until the fluid again reaches a stable viscosity. This second treatment assures the removal of practically all of the hydroxyl groups and an inert triorganosilyl endblock diorganosiloxane polymer substantially free of any reactive sites is produced.

In testing the stability of the siloxane oil can be tested with a phosphorous nitrile chloride. The addition of 2 to 3 drops of 40% solution of phosphorous nitrile chloride in methylene chloride to about 100 cc. of the oil results in the condensation of hydroxyls present in the siloxane molecules. Within 12 to 24 hours after the phosphorous nitrile chloride is added at room temperature to an unstabilized oil containing significant quantities of hydroxyl substituents, the oil will gel. A partially stabilized oil similarly tested will show an increase in viscosity of some two to one hundred times that of the starting material. An oil stabilized in accordance with this invention will show no increase and may even show a slight decrease in viscosity when so treated.

The following examples are offered to help in understanding and practicing this invention. The examples are illustrative and do not delineate the scope of the invention. All parts and percentages expressed in the examples are based on weight unless otherwise stated. The symbol "Me" represents a methyl radical and "Ph" a phenyl radical in the examples and all viscosities are taken at 25° C. unless otherwise stated.

Example 1

Dimethyldichlorosilane was hydrolyzed with an excess of water. The hydrolyzate was washed free of acid, filtered until clear and the resulting oil was separated from the water. 350 g. of a trimethylsiloxy endblocked dimethylsiloxane [Me$_3$SiO(Me$_2$SiO)$_x$SiMe$_3$] having a viscosity of 100 cs. at 25° C. and .3 cc. of a 40% solution of phosphorous nitrile chloride (PNCl$_2$)$_4$ in methylene chloride was added to the mixture. A current of air was blown through this mixture at room temperature for 24 hours. The mixture was kept in vigorous motion by the air current. The fluid mixture was then heated to 150° C. and retained at this temperature while air was blown through the mixture for 24 hours. The siloxane mixture slowly increased to a stable viscosity during each period of air blowing. The ultimate product was a clear oil having a viscosity of 70,000 cs. The oil contained less than 1 mg./liter of chlorine. A 20 g. sample of the oil was heated at 250° C. for two hours and lost about 0.5 percent of its weight with substantially no increase in viscosity indicating a very stable high viscosity oil was obtained.

Example 2

Employing the method and materials of Example 1, 5 kg. of hydrolyzate, 260 g. of Me$_3$SiO(Me$_2$SiO)$_x$SiMe$_3$ (viscosity 100 cs.) and .3 cc. of the phosphorous nitrile chloride were mixed, air blown for 24 hours at room temperature and for 24 hours at 150° C. The product was a stable, clear oil having a viscosity of 330,000 cs. containing less than 1 mg./liter of chlorine and having a weight loss of 0.4 percent and no noticeable change in viscosity when heated at 250° C. for two hours.

Example 3

Employing the method of Example 1, 50 kg. of the hydrolyzate prepared in Example 1, 3.5 kg. of a trimethylsiloxy endblock dimethylpolysiloxane having a viscosity of 80 cs. and 3 cc. phosphorous nitrile chloride were thoroughly mixed together. After air blowing at room temperature and at 150° C. as in Example 1, a clear oil having a viscosity of 24,000 cs. was obtained. This oil had a chlorine content below 1 mg./liter and lost .5 percent of its weight without noticeable change in viscosity when heated to 250° C. for 2 hours.

Example 4

Phenylmethyldichlorosilane was hydrolyzed, washed free of acid, filtered and separated as was the dimethyldichlorosilane in Example 1. 80 kg. of the hydrolyzate, 3.5 kg. of trimethylsiloxy endblocked dimethylsiloxane (viscosity of 80 cs.) and 4.2 cs. phosphorous nitrile chloride were thoroughly mixed together. The mixture was air-blown at room temperature and at 150° C. as in Example 1. A clear siloxane oil having a viscosity of 150,000 cs. and chlorine content of less than 1 mg./liter was obtained. This oil lost less than .5 percent of its weight and remained substantially constant in viscosity when heated at 250° C. for two hours.

Example 5

A mixture of 25 g. of trimethylsiloxy endblocked dimethylsiloxane polymer having a viscosity of 100 cs., 500 g. of a hydroxy endblocked dimethylsiloxane prepared as in Example 1, and 0.2 g. phosphorous acid dichloride anilide dissolved in 2 cs. of chloroform was air-blown at room temperature for three hours and thereafter at 150° C. for one hour. The resulting polymer was a clear oil having a viscosity of 350,000 cs. and was substantially free of any increase in viscosity when heated to 250° C. for two hours.

Example 6

Equivalent results are obtained when 2 to 5 cc. of phosphorous acid-dichloride-ethyl-anilide, phosphoric acid-anilide-anile, phosphorous acid-anilide-anile or phosphoric acid-dichloride methyl amide is substituted for the phosphorous nitrile chloride in the method of Example 1.

Example 7

Equivalent results are obtained when the hydrolyzate in Example 1 is entirely or partially replaced by the hydrolyzate of ethylmethyldichlorosilane, dibutyldichlorosilane, methylchlorophenyldimethoxysilane, diphenyldiethoxysilane, methyltolyldibromosilane, methyl(phenylethyl)-dichlorosilane, ethylcyclopropyldibutoxysilane or chloromethyl-3,3,3-trifluoropropyldichlorosilane or any mixture of these silanes.

Example 8

Equivalent results are achieved when the triorganosiloxy endblocked diorganosiloxane in Example 1 is replaced with Ph$_2$MeSiO(Me$_2$SiO)$_x$SiMe$_3$, Et$_3$SiO[Me$_2$SiO]$_x$SiEt$_2$Bu, Me$_3$SiO[MePhSiO]$_x$SiMe$_3$, or a trimethylsiloxy endblocked copolymer of phenylmethylsiloxane units and methylcyclopropyl units, or of diphenylsiloxane units and methyltolylsiloxane units, or of dimethylsiloxane units and di(phenylethyl)siloxane units, each of said siloxanes having a viscosity of about 100 cs. at 25° C.

That which is claimed is:

1. The method of preparing stabilized high viscosity organopolysiloxane oils characterized in that (A) a fluid mixture is prepared of (1) a hydroxyl endblocked diorganosiloxane wherein the organic substituents are selected from the group consisting of monovalent hydrocarbon radicals, halogenated monovalent hydrocarbon radicals and the trimethylsilmethylene radical, (2) a triorganosilyl endblocked diorganopolysiloxane of the average formula R$_3$SiO(R$_2$SiO)$_a$SiR$_3$ where R is a substituent selected from the group consisting of monovalent hydrocarbon radicals, halogenated monovalent hydrocarbon radicals, and a trimethylsilmethylene radical and $a$ has an average value such that the siloxane has a viscosity at 25° C. of from 1 to 10,000 cs., and (3) .0001 to 1.0% by weight of the total weight of (1) and (2) of a phosphorous-nitrogen compound selected from the group consisting of compounds of the formulae (PNCl$_2$)$_b$ where $b$ is an integer greater than 2,

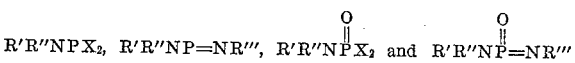

where each R' and each R" is a substituent selected from the group consisting of alkyl, aryl, aralkyl and alkaryl radicals and hydrogen, at least one of the substituents R' and R" being an organic radical, R''' is a radical selected from the group consisting of alkyl, aryl, aralkyl and alkaryl radicals, and X is a halogen atom, and (B) the mixture so prepared is brought into intimate contact with a stream of air at room temperature until the viscosity of the fluid mixture is substantially stabilized and thereafter (C) the mixture is brought into intimate contact with a stream of air at a temperature of from 100° to 200° C. until the viscosity of the fluid mixture is substantially stabilized.

2. The method of claim 1 wherein each R is a methyl radical.

3. The method of claim 1 wherein (1) the hydroxyl endblocked diorganopolysiloxane is a hydroxyl endblocked dimethylsiloxane and (2) the triorganosilyl endblocked diorganopolysiloxane has the average formula $(CH_3)_3SiO(CH_3C_6H_5SiO)_aSi(CH_3)_3$ where $a$ has an average value such that siloxane (2) has a viscosity at 25° C. of 25 to 200 cs.

4. The method of preparing stabilized high molecular weight triorganosilyl endblocked diorganosiloxane polymers comprising (A) mixing a hydroxyl endblocked diorganosiloxane, wherein the organic substituents are selected from the group consisting of monovalent hydrocarbon radicals, halogenated monovalent hydrocarbon radicals and the trimethylsilmethylene radical, with a low molecular weight triorganosilyl endblocked diorganosiloxane, wherein the organic substituents are selected from the group consisting of monovalent hydrocarbon radicals, halogenated monovalent hydrocarbon radicals and the trimethylsilmethylene radical, and a phosphorous-nitrogen compound selected from the group consisting of compounds of the formulae $(PNCl_2)_b$ where $b$ is an integer greater than 2, $$R'R''NPX_2,\ R'R''NP=NR''',\ R'R''N\overset{O}{\underset{\|}{P}}-X_2\ \text{and}\ R'R''N\overset{O}{\underset{\|}{P}}=NR'''$$

where each R' and each R'' is a monovalent substituent selected from the group consisting of alkyl, aryl, aralkyl and alkaryl radicals and hydrogen, at least one of the substituents R' and R'' being an organic radical, R''' is an organic radical selected from the group consisting of alkyl, aryl, aralkyl and alkaryl radicals, and each X is a halogen atom, (B) bubbling air through the mixture at room temperature until the viscosity of the mixture is substantially stabilized and thereafter (C) bubbling air through the mixture at a temperature in the range 135° C. to 175° C. until the fluid viscosity is substantially stabilized.

5. The method of claim 4 wherein the organic substituents in the siloxanes are methyl radicals.

6. The method of claim 4 wherein the phosphorous-nitrogen compound is $(PNCl_2)_b$ where $b$ has a value greater than 2 and less than 7.

7. The method of claim 4 wherein the organic substituents in the siloxanes are alkyl and aryl radicals.

References Cited in the file of this patent

UNITED STATES PATENTS

| | | |
|---|---|---|
| 2,397,727 | Daudt | Apr. 2, 1946 |
| 2,469,888 | Patnode | May 10, 1949 |
| 2,739,952 | Linville | Mar. 27, 1956 |
| 2,830,967 | Nitzsche et al. | Apr. 15, 1958 |

FOREIGN PATENTS

| | | |
|---|---|---|
| 930,481 | Germany | July 18, 1955 |

UNITED STATES PATENT OFFICE
CERTIFICATE OF CORRECTION

Patent No. 2,990,419                       June 27, 1961

Siegfried Nitzsche et al.

It is hereby certified that error appears in the above numbered patent requiring correction and that the said Letters Patent should read as corrected below.

Column 3, lines 56 to 59, the third formula should appear as shown below instead of as in the patent:

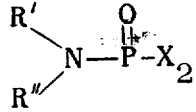

sane column 3, line 75, the formula should appear as shown below instead of as in the patent:

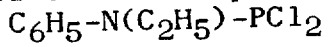

Signed and sealed this 23rd day of January 1962.

(SEAL)
Attest:

ERNEST W. SWIDER
Attesting Officer

DAVID L. LADD
Commissioner of Patents